United States Patent
Jan (12)

(10) Patent No.: US 6,481,686 B1
(45) Date of Patent: Nov. 19, 2002

(54) MULTIFUNCTIONAL TURNTABLE FOR A LEVELING DEVICE

(75) Inventor: Der-Shyang Jan, Taipei (TW)

(73) Assignee: Quarton Inc. (TW)

( * ) Notice: Subject to any disclaimer, the term of this patent is extended or adjusted under 35 U.S.C. 154(b) by 0 days.

(21) Appl. No.: 09/669,176

(22) Filed: Sep. 25, 2000

(51) Int. Cl.[7] .............................................. A47B 91/00
(52) U.S. Cl. .................................................. 248/349.1
(58) Field of Search ............................. 248/349.1, 676, 248/678, 122.1, 177.1, 180.1, 346.03; 33/281, 283, 290

(56) References Cited

U.S. PATENT DOCUMENTS 6,231,020 B1  *  5/2001  Willson

FOREIGN PATENT DOCUMENTS

| JP | 63-182515 | * | 7/1988 |
| TW | 88207440 | * | of 1988 |

* cited by examiner

Primary Examiner—Ramon O. Ramirez
(74) Attorney, Agent, or Firm—Raymond Sun

(57) ABSTRACT

A multifunctional turntable for a leveling device includes a pedestal, a limb, a level adjustment means and a turn member. The turn member has an open end trough and clamp boards to hold a measuring or surveying instrument therebetween and thereby a plane pressure is used to clamp the instrument. By providing the multifunctional turntable of the present invention, a wide variety of instruments can then be carried securely and steadily, and a horizontal level of the carried instrument can thus be easily achieved.

11 Claims, 4 Drawing Sheets

MULTIFUNCTIONAL TURNTABLE FOR A LEVELING DEVICE

BACKGROUND OF THE INVENTION (1) Field of the Invention

This invention relates to a multifunctional turntable for a leveling device and more particularly to a turntable that provides a plurality of holding levels and adjustment means for accommodating a variety of surveying instruments for different purposes.

(2) Description of the Prior Art

Conventionally, a leveling device is usually used for surveying horizontal level and angles. When coupling with other instruments such as surveying tools, laser pointers, spectrum extenders and the like, the leveling device can also be used for surveying vertical angle and latitude.

However, when using on an uneven land, the leveling device has to be placed on a tripod which is not stable and might be difficult to provide an accurate horizontal surface as the operation needs.

Taiwan Patent application number 88207440, was introduced to remedy this leveling problem by providing a turntable which has a base for mounting the turntable onto a tripod or the like, and a turntable surface for holding the leveling device. Although the prior art did offer some improvement, it is still far from perfect for providing a stable and easy-to-adjust means to support the turntable for the leveling device.

SUMMARY OF THE INVENTION

It is an object of this invention to provide a multifunctional turntable for a leveling device that may support a variety of leveling devices for surveying a horizontal surface or vertical angles, may hold the leveling device steadily and securely, and may be adjusted easily to obtain a horizontal surface and a vertical angle as desired.

The multifunctional turntable for a leveling device in accordance with the present invention includes a pedestal, a limb, a level adjustment means, and a turn member.

The pedestal of the present invention further includes a top plane.

The limb is located above the pedestal and further has a bottom plane and a top end for a rotation hub to be formed thereon.

The level adjustment means is located between the pedestal and the limb for adjusting distance in between.

The turn member located above and pivotally engaged with the limb further has a screw seat at one side for an adjustment screw to be engaged with and has an open end trough which includes a first step trough and a second step trough. The first step trough further has two side walls, and each side wall has a cavity for holding a clamp knob having one end extending in the first step trough for engaging with a clamp board through a set screw, and a washer fixed to the end. The second step trough having a side wall which has two screw bores engageable with two clamp screws.

In the present invention, the first or the second step trough may hold and clamp an object, said a leveling device, therein.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
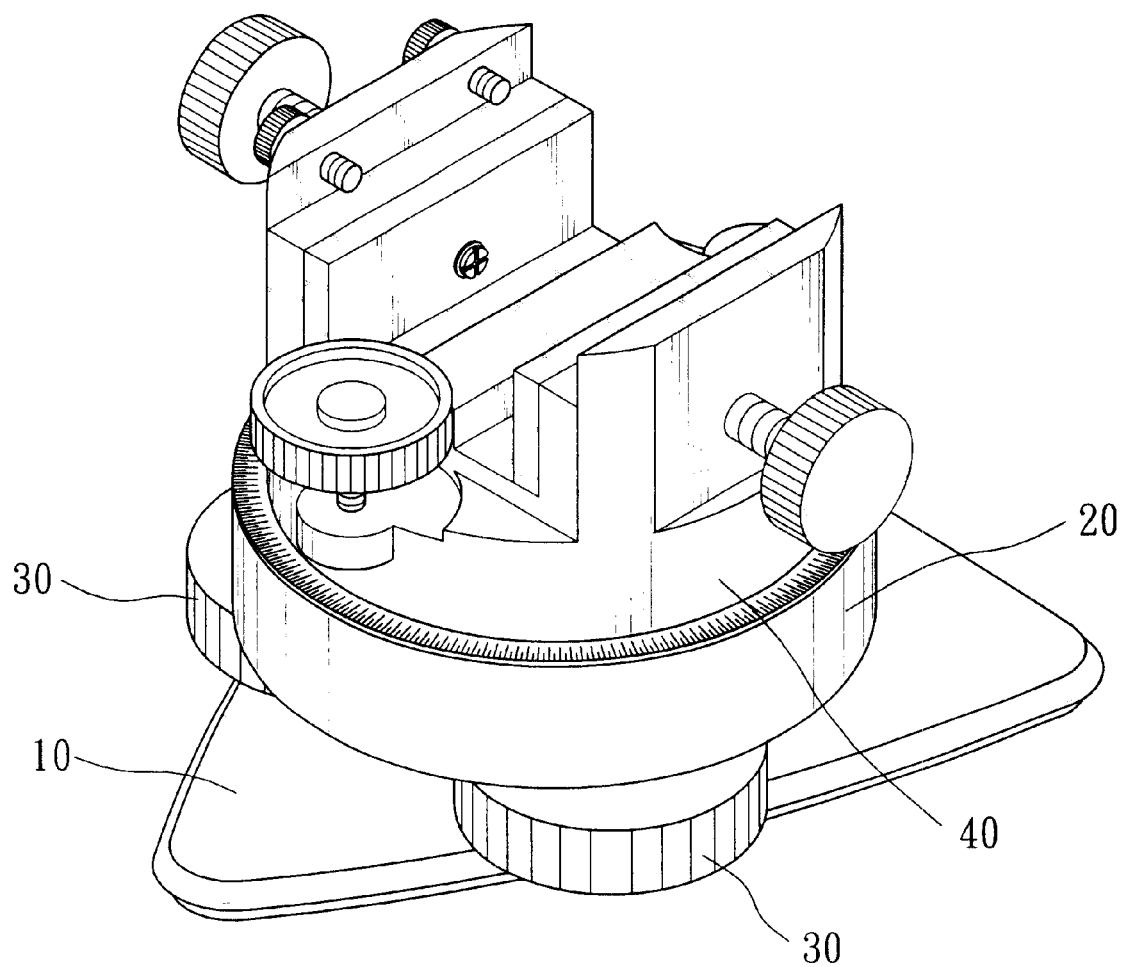
FIG. 1 is the perspective view of this invention.
Figure 2:
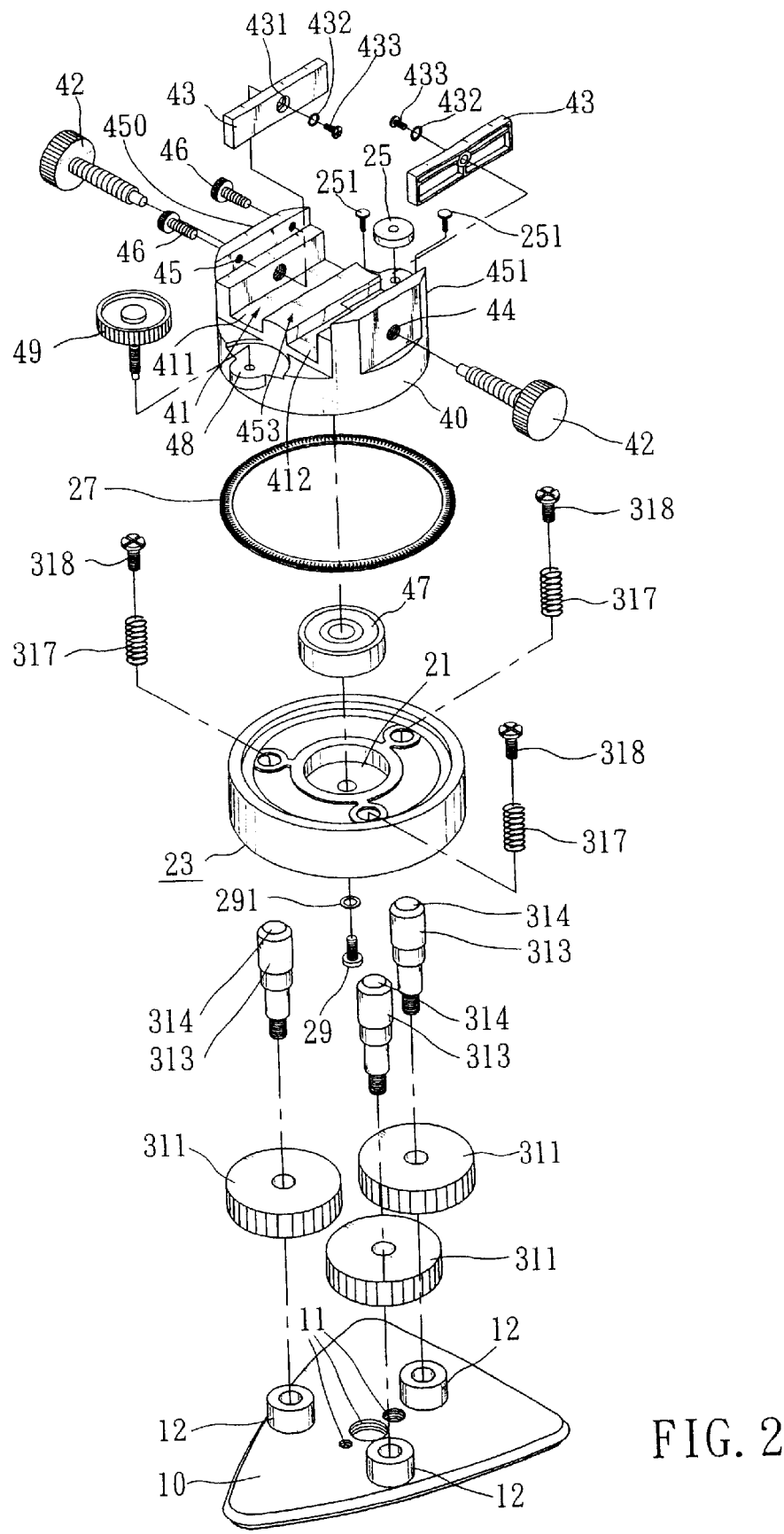
FIG. 2 is an exploded view of this invention.

Referring now to FIGS. 1 and 2, the multifunction turntable according to this invention includes a pedestal 10, a limb 20, a level adjustment means 30 and a turn member 40.

The pedestal 10 may be placed on a platform or mounted on a tripod for fastening thereon through at least one screw bores 11 (three are shown in FIG. 2).

The limb 20 is located above the pedestal 10 and has a rotation hub 21 formed in the center.

The level adjustment means 30, located between the pedestal 10 and the limb 20, includes three sets of wheels 311. Each wheel 311 can engage with a screw bolt 313 which has a lower end engaged with a bolt collar 12 located on the pedestal 10 and an upper end having a cavity 314 formed therein. The upper end of the screw bolt 313 is firmly engaged with the bottom of the level adjustments means 30 by means of a screw 318 compressed a spring 317 in the cavity 314 through the limb 2.

The turn member 40 has an open trough 41 at the upper portion which includes a first step trough 411 and a second step trough 412 that are separated by a vertical ridge 453. The open trough 41 has two side walls 450 and 451. Each side wall 450 and 451 has a screw bore 44 formed in the center and which is engageable with a corresponding clamp knob 42 from its outer side. Each clamp knob 42 has one end extending into the first or second step trough 411 or 412 and engaging with a corresponding clamp board 43 through a cavity 431 in the clamp board 43. Each clamp board 43 is fixed to the corresponding clamp knob 42 by a set screw 433 and a washer 432 fastening on the end of the clamp knob 42. In one side wall 451, there are a pair of screw bores 45, and each of them can engage with a clamp screw 46. At one end of the trough 41, there is a screw seat 48 engaged with an adjustment knob 49. At another end of the trough 41, there is a leveling bubble 25 coupling with an adjustment screw 251.

The rotation hub 21 has a bearing 47 located therein to facilitate rotation of the turn member 40. The turn member 40 may be vertically engaged with the limb 20 by means of a set screw 29 and a washer 291. An angle scale disk 27 may also be sandwiched between the turn member 40 and limb 20 to facilitate angle measuring.

Figure 3:
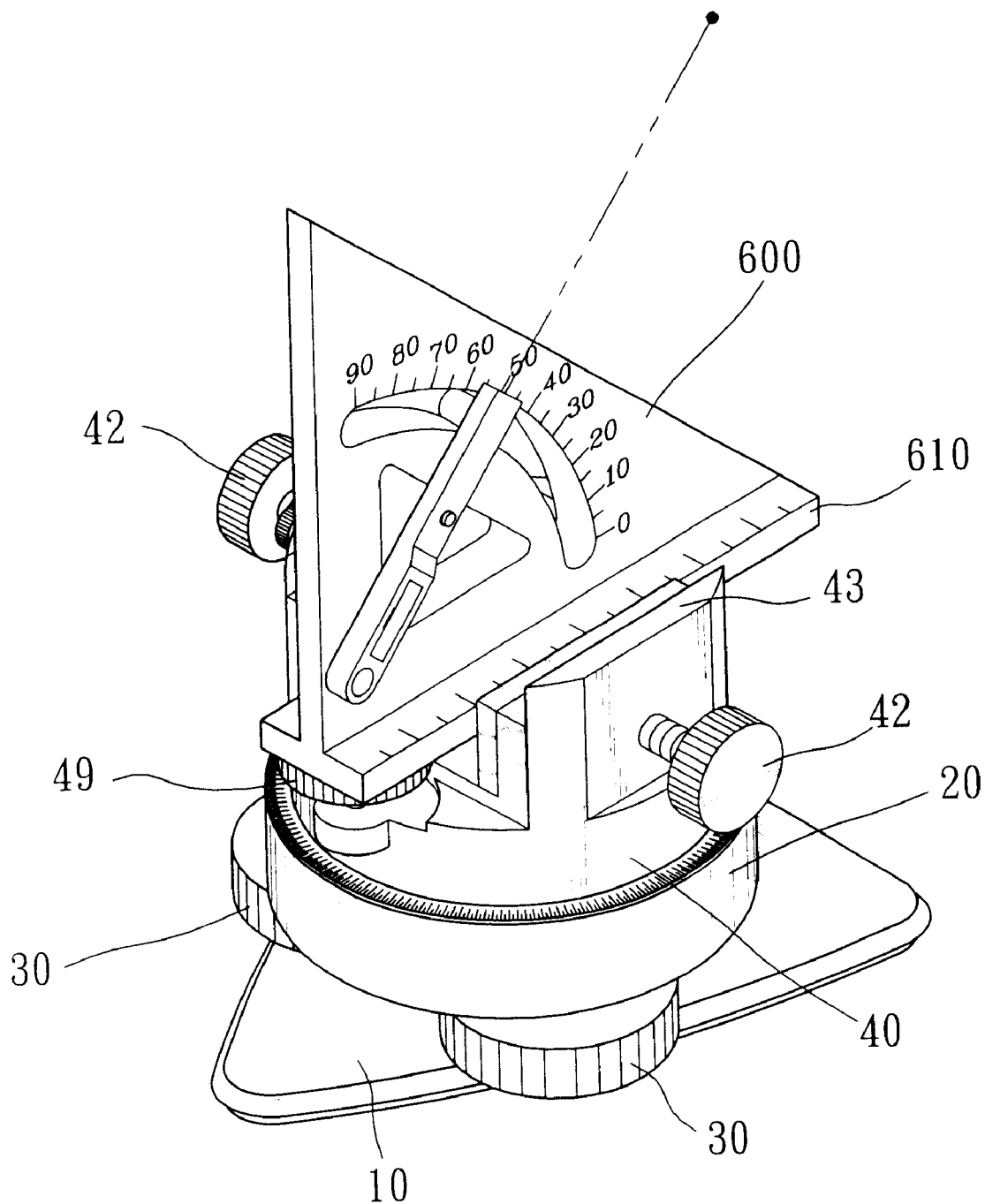
FIG. 3 is a perspective view of this invention supporting a laser vertical angle leveling device.

FIG. 3 shows an example of this invention in use. A laser vertical angle leveler 600 has a base 610 mounted in the first step trough 411 and may be securely held in place by the clamp board 43 from both sides. By turning the wheels 311, the bolt 313 may be raised or lowered in the bolt collar 12 so that the horizontal level of the leveler 600 may be achieved quickly. The adjustment knob 49 may be used for fine-tuning the level adjustment when needed.

Figure 4:
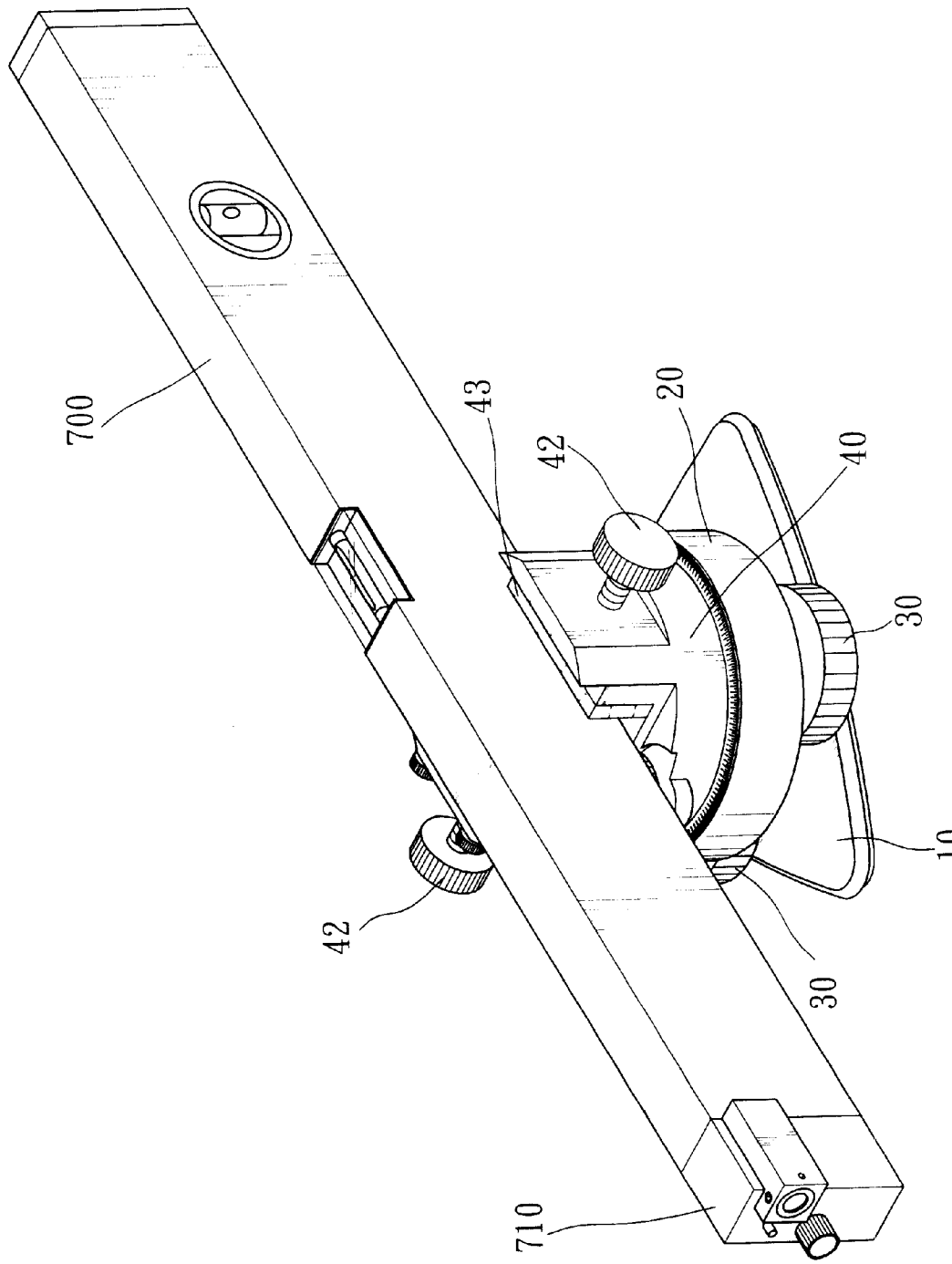
FIG. 4 is a perspective view of this invention supporting a beam type leveling device.

FIG. 4 shows another example of this invention in use. A beam type leveling device 710 equipped with a laser means 710 is held securely in the first step trough 411 by the clamp board 43 at two sides. The horizontal level may be achieved quickly by means of the level adjustment means 30 and may be fine-tuning easily through the adjustment knob 49.

While the first step trough 411 may hold the leveling device with an ordinary size, the second step trough 412 may be used to hold another kind of leveling devices or other surveying instruments with wider bases.

Because of the clamp board 43 used for adjustment in this invention, clamping force may be applied onto a "face" rather then a "point" as usually does in a conventional leveling device. The leveling device may thus be held more securely and steadily. In the present invention, two troughs with different sizes are provided so that a wide variety of measuring and surveying instruments may be used. Also, the fast level adjustment means and the fine-tuning fixture are offered in the present invention to make level-adjusting faster and more accurate. All these increase the convenience and usefulness of the present invention.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A turntable for a leveling device, comprising:

a pedestal having a top plane;

a limb positioned above the pedestal, the limb having a bottom plane and a top end, with a rotation hub formed on the top end;

a level adjuster positioned between the pedestal and the limb for adjusting the distance between the pedestal and the limb; and a turn member positioned above and pivotally engaged with the limb, the turn member having an open trough which includes a first step trough and a second step trough that are separated by a vertical member.

2. The turntable of claim 1, wherein the open trough has two side walls, each adjacent one of the step troughs and each side wall having a bore through which a separate clamp knob extends to engage with a corresponding clamp board through a screw set and a washer fixed to the corresponding clamp knob.

3. A turntable for a leveling device, comprising:

a pedestal having a top plane;

a limb positioned above the pedestal, the limb having a bottom plane and a top end, with a rotation hub formed on the top end;

a level adjuster positioned between the pedestal and the limb for adjusting the distance between the pedestal and the limb; and a turn member positioned above and pivotally engaged with the limb, the turn member having an open trough which includes a first step trough and a second step trough;

wherein the turn member has a screw seat at one side that is engaged with an adjustment screw.

4. In combination:

(i) a turntable, comprising:

a pedestal having a top plane;

a limb positioned above the pedestal, the limb having a bottom plane and a top end, with a rotation hub formed on the top end;

a level adjuster positioned between the pedestal and the limb for adjusting the distance between the pedestal and the limb; and a turn member positioned above and pivotally engaged with the limb, the turn member having an open trough which includes a first step trough and a second step trough; and (ii) a leveling device that includes a first leveling device that is seated in the first step trough, and a second leveling device that is seated in the second step trough.

5. A turntable for a leveling device, comprising:

a pedestal having a top plane;

a limb positioned above the pedestal, the limb having a bottom plane and a top end, with a rotation hub formed on the top end;

a level adjuster positioned between the pedestal and the limb for adjusting the distance between the pedestal and the limb; and a turn member positioned above and pivotally engaged with the limb, the turn member having an open trough which includes a first step trough and a second step trough;

wherein the level adjuster comprises a plurality of wheels.

6. The turntable of claim 5, wherein each of the plurality of wheels is rotatably secured to a corresponding screw bolt, with a corresponding spring biased against each corresponding screw bolt.

7. In combination:

(i) a turntable, comprising:

a pedestal having a top plane;

a limb positioned above the pedestal, the limb having a bottom plane and a top end, with a rotation hub formed on the top end;

a level adjuster positioned between the pedestal and the limb for adjusting the distance between the pedestal and the limb; and a turn member positioned above and pivotally engaged with the limb, the turn member having an open trough which includes a first step trough and a second step trough that are separated by a vertical member; and (ii) a leveling device seated in either the first step trough or the second step trough.

8. The combination of claim 7, wherein the turn member has a screw seat at one side that is engaged with an adjustment screw.

9. The combination of claim 7, wherein the open trough has two side walls, each adjacent one of the step troughs and each side wall having a bore through which a separate clamp knob extends to engage with a corresponding clamp board through a screw set and a washer fixed to the corresponding clamp knob.

10. The combination of claim 7, wherein the level adjuster comprises a plurality of wheels.

11. The combination of claim 10, wherein each of the plurality of wheels is rotatably secured to a corresponding screw bolt, with a corresponding spring biased against each corresponding screw bolt.

* * * * *